(12) United States Patent
Agarwal et al.

(10) Patent No.: US 11,981,268 B2
(45) Date of Patent: May 14, 2024

(54) ENERGY ABSORBING MATERIAL FOR A VEHICLE

(71) Applicant: GM Global Technology Operations LLC, Detroit, MI (US)

(72) Inventors: Varun Agarwal, Bengaluru (IN); Biswajit Tripathy, Bangalore (IN); Rajamanickam Vs, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 185 days.

(21) Appl. No.: 17/500,320

(22) Filed: Oct. 13, 2021

(65) Prior Publication Data

US 2023/0116375 A1 Apr. 13, 2023

(51) Int. Cl.
*B60R 13/02* (2006.01)
*B60R 21/04* (2006.01)
*F16F 7/12* (2006.01)
*B33Y 80/00* (2015.01)

(52) U.S. Cl.
CPC .......... *B60R 13/0212* (2013.01); *B60R 21/04* (2013.01); *F16F 7/121* (2013.01); *B33Y 80/00* (2014.12); *B60R 2021/0435* (2013.01); *B60R 2021/0442* (2013.01)

(58) Field of Classification Search
CPC ................ B60R 13/0212; B60R 21/04; B60R 2021/0412; B60R 2021/0421; B60R 2021/0442; F16F 7/121
See application file for complete search history.

(56) References Cited

U.S. PATENT DOCUMENTS

| | | | |
|---|---|---|---|
| 7,326,466 B2 | 2/2008 | Hirota et al. | |
| 8,449,707 B2 | 5/2013 | Simmons et al. | |
| 8,790,776 B2 | 7/2014 | Zeller | |
| 10,106,117 B2 * | 10/2018 | Zaldivar Ortiz | ........ B60R 21/04 |
| 10,611,278 B2 * | 4/2020 | Pardue | .............. B64D 11/0647 |
| 10,753,418 B2 * | 8/2020 | Schaedler | ............. B32B 27/302 |
| 11,162,556 B2 * | 11/2021 | Lowe | ...................... B60R 21/02 |
| 2004/0119184 A1 | 6/2004 | Brown et al. | |
| 2015/0175210 A1 * | 6/2015 | Raymond | .............. B62D 21/10 29/897.2 |
| 2018/0156296 A1 * | 6/2018 | Alexander | .......... B60R 13/0815 |
| 2020/0023584 A1 * | 1/2020 | Portela | .................... B29C 64/30 |
| 2021/0316501 A1 * | 10/2021 | Boyce | ................... B33Y 80/00 |
| 2021/0341028 A1 * | 11/2021 | Fukui | ..................... B32B 15/20 |

(Continued)

FOREIGN PATENT DOCUMENTS

JP 2005247081 A 9/2005

OTHER PUBLICATIONS

Bots, M. J. "Energy Absorption of Additively Manufactured Lattices: On biomimetic abstraction of structural principles toward increased energy absorption in lattice structures." (2017). pp. 1-96.

*Primary Examiner* — Jason S Morrow
(74) *Attorney, Agent, or Firm* — CANTOR COLBURN LLP (57) ABSTRACT

An energy absorbing material includes a multi-cellular structure formed from a plurality of interconnected cells having a lattice structure. Each of the plurality of interconnected cells includes at least four nodes and at least one lattice element extending between each of the at least four nodes. The at least one lattice element has a diameter no greater than 2.5 mm.

20 Claims, 6 Drawing Sheets

(56) References Cited

U.S. PATENT DOCUMENTS

| | | | |
|---|---|---|---|
| 2021/0341031 A1* | 11/2021 | Kabaria | B33Y 80/00 |
| 2022/0152972 A1* | 5/2022 | Yoshida | B32B 27/12 |
| 2023/0009520 A1* | 1/2023 | Selvasekar | B62D 21/152 |
| 2023/0015489 A1* | 1/2023 | Rueger | F16F 7/121 |
| 2023/0039993 A1* | 2/2023 | Buhr | B32B 5/08 |
| 2023/0053918 A1* | 2/2023 | Gu | B32B 15/01 |
| 2023/0121977 A1* | 4/2023 | Jenett | A47C 17/86 5/690 |

\* cited by examiner

ENERGY ABSORBING MATERIAL FOR A VEHICLE

INTRODUCTION

The subject disclosure relates to the art of vehicles and, more particularly, to an energy absorption material for a vehicle.

There are numerous safety standards that apply to the manufacture of vehicles. Many of the standards are directed to acceleration force limits that a passenger may experience during a particular event. One such standard is headliner impact. Headliners must include an amount of energy absorbing material so as to reduces head impact forces and meet head injury criteria (HIC) standards. Headliners typically possess very low depths, (e.g., space between the headliner and a steel roof frame), and thus there are a limited number of energy absorbing materials that satisfy current standards.

Current materials have a defined thickness that places constraints on designers. That is, headliner thickness cannot be reduced further and still accommodate current energy absorbing materials. Designers are constantly looking to add more space in a passenger compartment. The additional space may accommodate switches, head space, accessories, and/or the like. Accordingly, the industry would welcome systems for reducing HIC in an automobile that require less space between the headliner and the steel roof frame.

SUMMARY

In accordance with a non-limiting example, an energy absorbing material including a multi-cellular structure formed from a plurality of interconnected cells having a lattice structure. Each of the plurality of interconnected cells includes at least four nodes and at least one lattice element extending between each of the at least four nodes. The at least one lattice element has a diameter no greater than 2.5 mm.

In addition to one or more of the features described herein the at least one lattice element extends substantially linearly between the at least two nodes.

In addition to one or more of the features described herein the at least one lattice element is curvilinear and includes a bend portion.

In addition to one or more of the features described herein the at least one bend portion has an angle of about 132°.

In addition to one or more of the features described herein each of the plurality of interconnected cells includes a body centered cubic geometry.

In addition to one or more of the features described herein the at least one lattice element has a diameter of no greater than 1.0 mm.

In addition to one or more of the features described herein the at least one lattice element includes a first end connected to one of the at least four nodes, a second end connected to another of the at least four nodes, and an intermediate portion.

In addition to one or more of the features described herein the first end and the second end include a first diameter and the intermediate portion includes a second diameter that is larger than the first diameter.

In addition to one or more of the features described herein the each of the plurality of interconnected cells includes a Kelvin lattice geometry.

In addition to one or more of the features described herein each of the plurality of interconnected cells is formed from 3D printable nylon.

In accordance with another non-limiting example, a vehicle includes a body having a passenger compartment and an energy absorbing material disposed in the passenger compartment. The energy absorbing material includes a multi-cellular structure formed from a plurality of interconnected cells having a lattice structure. Each of the plurality of interconnected cells includes at least four nodes and at least one lattice element extending between each of the at least four nodes. The at least one lattice element has a diameter no greater than 2.5 mm.

In addition to one or more of the features described herein the at least one lattice element extends substantially linearly between the at least two nodes.

In addition to one or more of the features described herein the at least one lattice element is curvilinear and includes a bend portion.

In addition to one or more of the features described herein the at least one bend portion has an angle of about 132°.

In addition to one or more of the features described herein each of the plurality of interconnected cells includes a body centered cubic geometry.

In addition to one or more of the features described herein the at least one lattice element has a diameter of no greater than 1.0 mm.

In addition to one or more of the features described herein the at least one lattice element includes a first end connected to one of the at least four nodes, a second end connected to another of the at least four nodes, and an intermediate portion.

In addition to one or more of the features described herein the first end and the second end include a first diameter and the intermediate portion includes a second diameter that is larger than the first diameter.

In addition to one or more of the features described herein the each of the plurality of interconnected cells includes a Kelvin lattice geometry.

In addition to one or more of the features described herein each of the plurality of interconnected cells is formed from 3D printable nylon.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
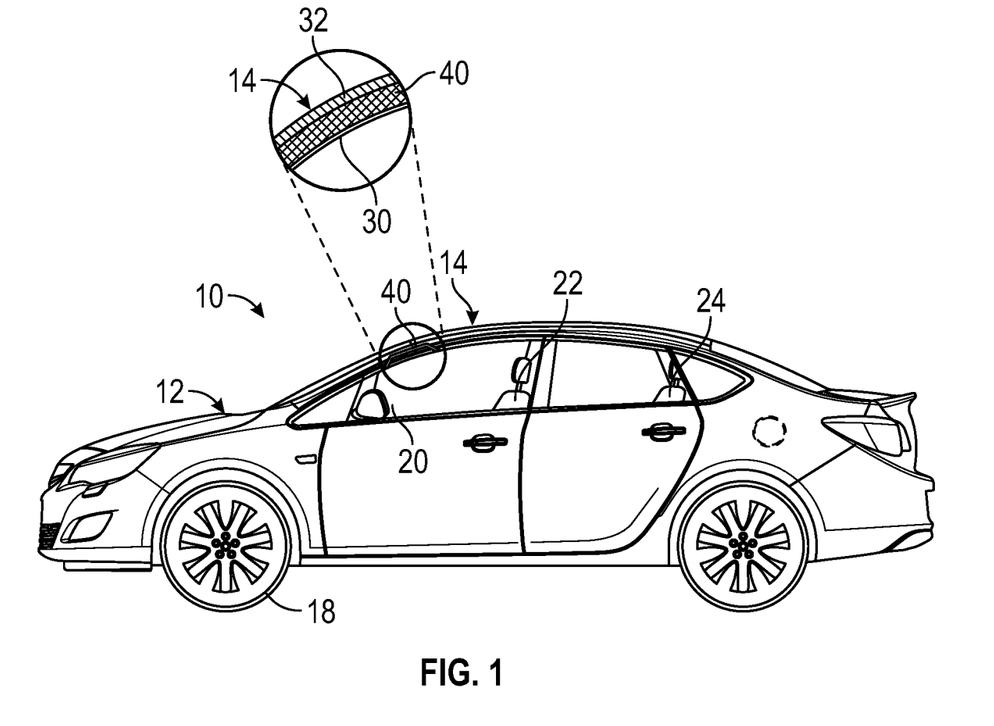
FIG. 1 depicts a partially cut-away view of a vehicle including an energy absorbing material incorporated into a head liner, in accordance with a non-limiting example.

A vehicle, in accordance with a non-limiting example, is indicated generally at 10 in FIG. 1. Vehicle 10 includes a body 12 including a roof 14 supported on a frame (not shown) and a plurality of wheels, one of which is indicated at 18. Body 12 includes a passenger compartment 20 that includes a front seat 22 and a rear seat 24. Body 12 also includes a headliner 30 that is arranged inwardly of a steel frame member 32 that forms part of, for example, roof 14. An amount of energy absorbing material 40 is arranged between headliner 30 and steel frame member 32. Energy absorbing material 40 absorbs energy from, for example, head impacts during a crash event so as to reduce potential injuries.

Figure 2:
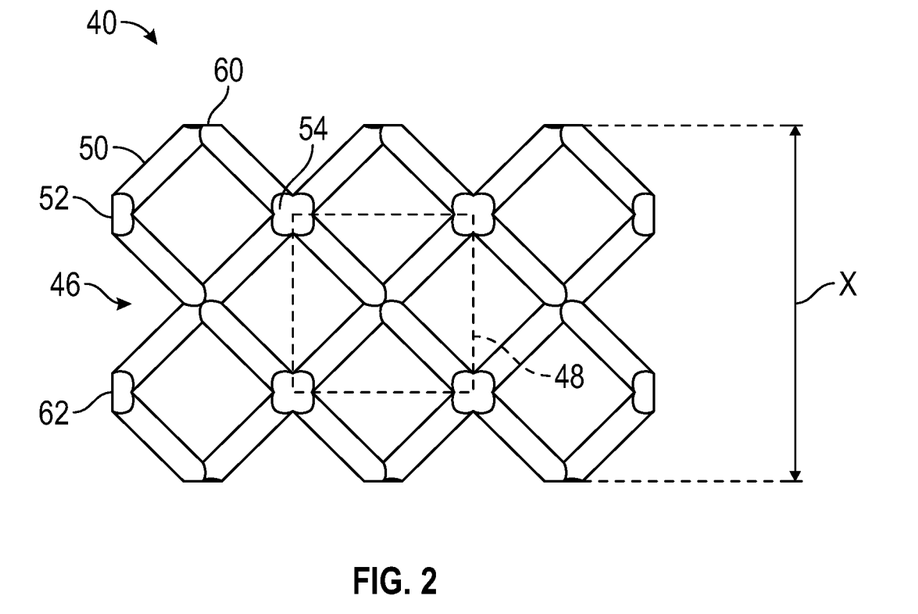
FIG. 2 is a cross-sectional view of the energy absorbing material including a multi-cellular lattice formed from a plurality of interconnected cells having a lattice structure, in accordance with a non-limiting example.

Referring to FIG. 2, energy absorbing material 40 takes the form of a multi-cellular structure including a plurality of interconnected cells 46. Plurality of interconnected cells 46 are connected so as to form a body centric cubic (BCC) structure 48. In a non-limiting example, energy absorbing material 40 has an overall thickness of about 14 mm. In another non-limiting example, energy absorbing material 40 includes an overall thickness "X" of about 12 mm. In yet another non-limiting example, each cell of the plurality of interconnected cells 46 includes a thickness no greater than 6 mm.

Figure 3:
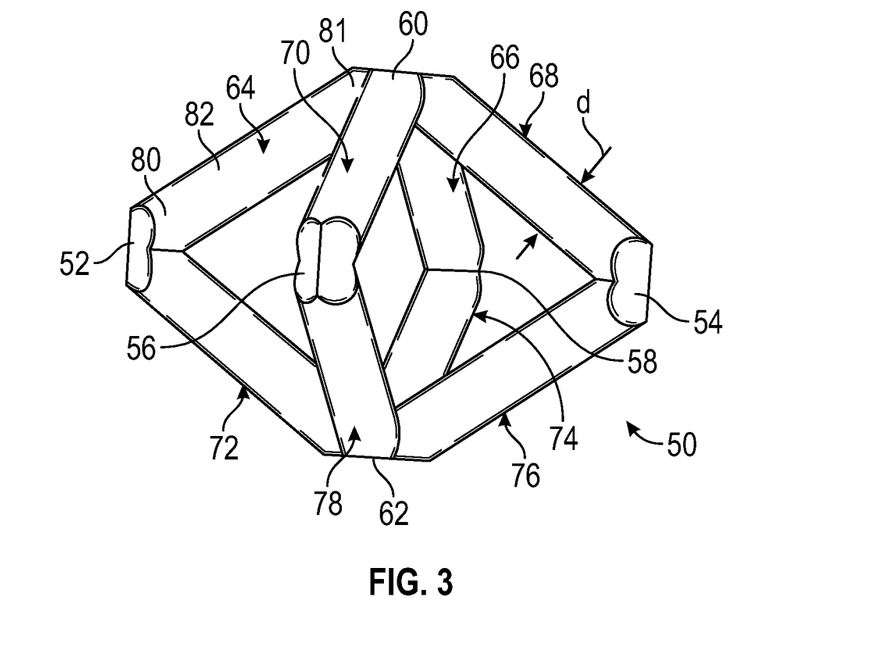
FIG. 3 is a plan view of the lattice structure of one of the plurality of interconnected cells of FIG. 2.

Reference will now follow to FIG. 3, with continued reference to FIG. 2, in describing a cell 50 of the plurality of interconnected cells 46. Cell 50 includes a first node 52, a second node 54, a third node 56, a fourth node 58, a fifth node 60, and a sixth node 62. Each of the nodes 52, 54, 56, 58, 60, and 62 are connected by lattice elements. In a non-limiting example, a first lattice element 64 joins first node 52 and fifth node 60. A second lattice element 66 joins fourth node 58 and fifth node 60, a third lattice element 68 joins second node 54 and fifth node 60, and a fourth lattice element 70 joins third node 56 and fifth node 60. A fifth lattice element 72 joins first node 52 and sixth node 62. A sixth lattice element 74 joins fourth node 58 and sixth node 62, a seventh lattice element 76 joins second node 54 and sixth node 62, and an eighth lattice element 78 joins third node 56 and sixth node 62.

In a non-limiting example, each lattice element includes a first end 80, a second end 81, and an intermediate portion 82 such as shown in connection with first lattice element 64. In a non-limiting example, each lattice element 64, 66, 68, 70, 72, 74, 76, and 78 includes a substantially constant diameter and extends substantially linearly between nodes. In a non-limiting example, each lattice element 64, 66, 68, 70, 72, 74, 76, and 78 has a diameter that is about 2 mm. In another non-limiting example, each lattice element 64, 66, 68, 70, 72, 74, 76, and 78 has a 1 mm diameter. It should be understood that the particular diameter of lattice elements 64, 66, 68, 70, 72, 74, 76, and 78 may vary and can be tuned to specific space requirements between headliner 30 and steel frame member 32.

Figure 4:
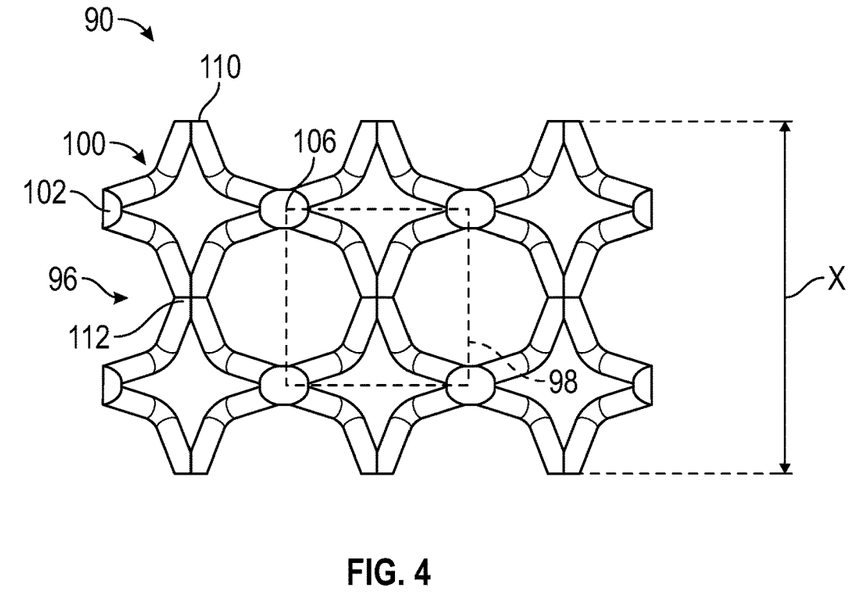
FIG. 4 is a cross-sectional view of the energy absorbing material including a multi-cellular lattice formed from a plurality of interconnected cells having a lattice structure, in accordance with another non-limiting example.

Reference will now follow to FIG. 4 in describing an energy absorbing material 90 formed in accordance with another non-limiting example. Energy absorbing material 90 comprises a multi-cellular structure formed from a plurality of interconnected cells 96. In a non-limiting example, plurality of interconnected cells 96 are connected so as to form a body centric cubic (BCC) structure 98. In a non-limiting example, energy absorbing material 90 has an overall thickness "X" of about 14 mm. In another non-limiting example, energy absorbing material 90 includes an overall thickness of about 12 mm. In yet another non-limiting example, each cell of the plurality of interconnected cells 96 includes a thickness no greater than 6 mm.

Figure 5:
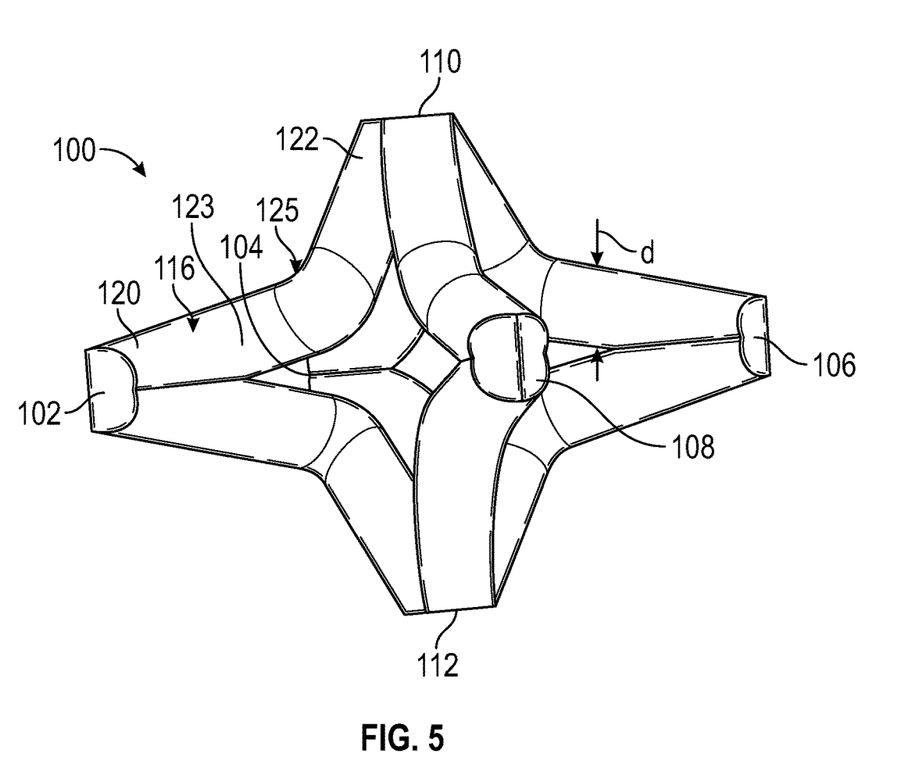
FIG. 5 is a plan view of the lattice structure of one of the plurality of interconnected cells of FIG. 4.

Reference will now follow to FIG. 5, with continued reference to FIG. 4 in describing a cell 100 of the plurality of interconnected cells 96. Cell 100 includes a first node 102, a second node 104, a third node 106, a fourth node 108, a fifth node 110, and a sixth node 112. Each of the nodes 102, 104, 106, 108, 110, and 112 are connected by lattice elements, one of which is indicated at 116. In a non-limiting example, lattice element 116 includes a first end 120, a second end 122, and an intermediate portion 123.

In a non-limiting example, lattice element 116 includes a substantially constant diameter and extends between first node 102 and fifth node 110. In a non-limiting example, lattice element 116 has a diameter that is about 2 mm. In another non-limiting example, lattice element 116 has a 1 mm diameter. In a non-limiting example, lattice element 116 is curvilinear. That is, intermediate portion 123 includes a bend portion 125 having an angle of about 132°. It should be understood that the particular diameter of lattice element 116 may vary and can be tuned to specific space requirements between headliner 30 and steel frame member 32. Further, it should be understood that while discussed in connection with lattice element 116, each of the lattice elements of energy absorbing material 90 include similar structure.

Figure 6:
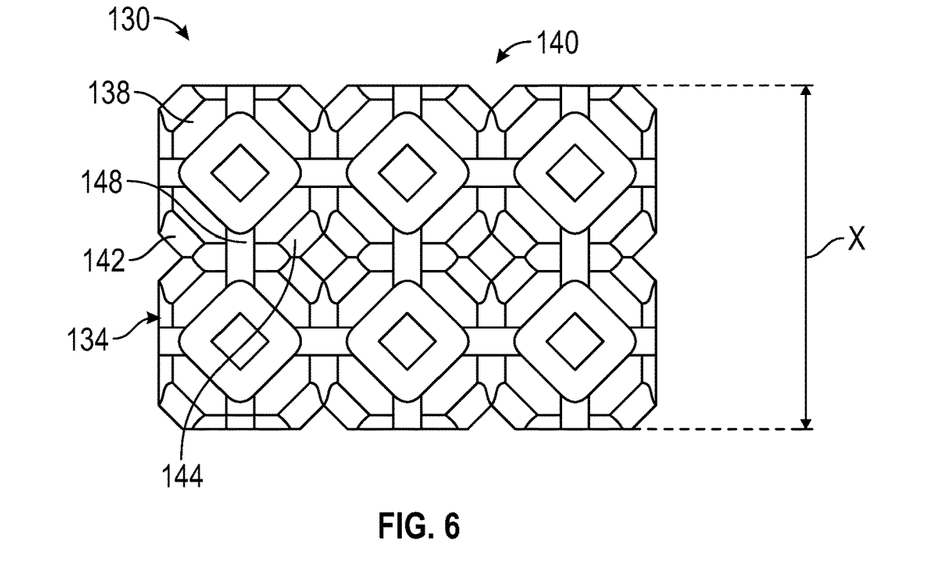
FIG. 6 is a cross-sectional view of the energy absorbing material including a multi-cellular lattice formed from a plurality of interconnected cells having a lattice structure, in accordance with a non-limiting example.

Reference will now follow to FIG. 6 in describing energy absorbing material 130 in accordance with another non-limiting example. Energy absorbing material 130 comprises a multi-cellular structure formed from a plurality of interconnected cells 134. In a non-limiting example, plurality of interconnected cells 134 are connected so as to form a Kelvin cell geometry. In a non-limiting example, energy absorbing material 130 has an overall thickness "X" of about 14 mm. In another non-limiting example, energy absorbing material 130 includes an overall thickness of about 12 mm. In yet another non-limiting example, each cell of the plurality of interconnected cells 134 includes a thickness no greater than 6 mm.

Figure 7:
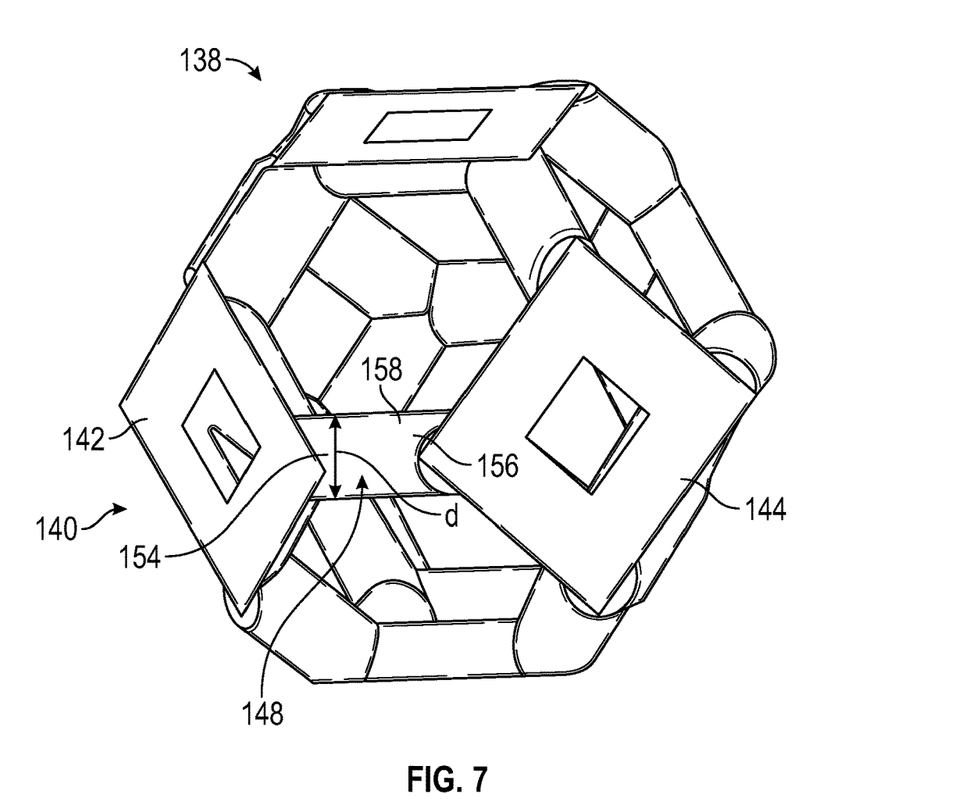
FIG. 7 is a plan view of the lattice structure of one of the plurality of interconnected cells of FIG. 6.

Reference will now follow to FIG. 7, with continued reference to FIG. 6 in describing a cell 138 of the plurality of interconnected cells 134. Cell 138 includes a plurality of nodes, two of which are indicated at 142 and 144. Nodes 142 and 144 are joined by a lattice element 148. At this point, it should be understood that each cell 138 includes at least six nodes that are connected through lattice elements similar to that discussed herein in connection with lattice element 148.

In a non-limiting example, lattice element 148 includes a first end 154, a second end 156, and an intermediate portion 158.

In a non-limiting example, lattice element 148 includes a substantially constant diameter "d". In a non-limiting example, lattice element 148 has a diameter that is about 2 mm. In another non-limiting example, lattice element 148 has a 1 mm diameter. It should be understood that the particular diameter of lattice element 148 may vary and can be tuned to specific space requirements between headliner 30 and steel frame member 32. Further, it should be understood that while discussed in connection with lattice element 148, each of the lattice elements of energy absorbing material 130 include similar structure.

Figure 8:
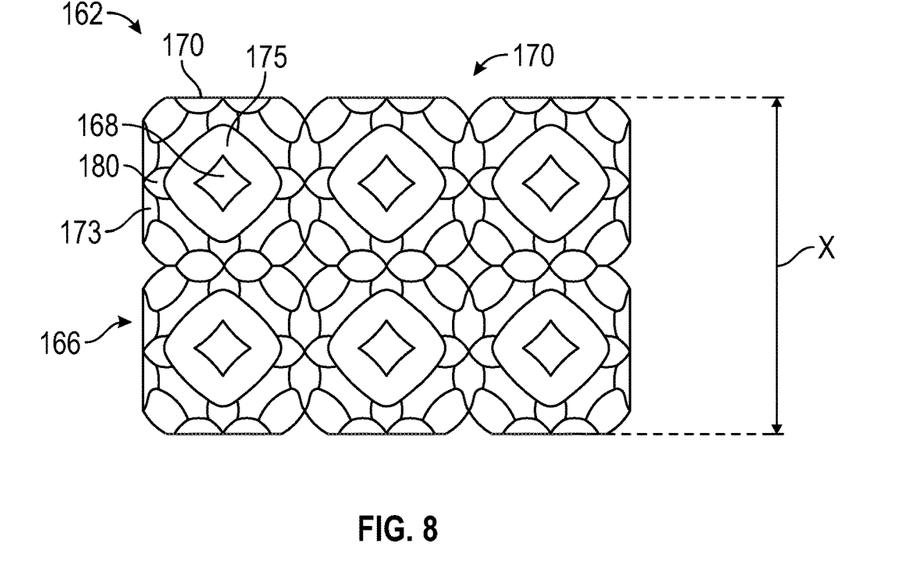
FIG. 8 is a cross-sectional view of the energy absorbing material including a multi-cellular lattice formed from a plurality of interconnected cells having a lattice structure, in accordance with yet another non-limiting example.

Reference will now follow to FIG. 8 in describing an energy absorbing material 162 in accordance with another non-limiting example. Energy absorbing material 162 comprises a multi-cellular structure formed from a plurality of interconnected cells 166. In a non-limiting example, plurality of interconnected cells 166 are connected so as to form a Kelvin cell geometry. In a non-limiting example, energy absorbing material 162 has an overall thickness of about 14 mm. In another non-limiting example, energy absorbing material 162 includes an overall thickness "X" of about 12 mm. In yet another non-limiting example, each cell of the plurality of interconnected cells 166 includes a thickness no greater than 6 mm.

Figure 9:
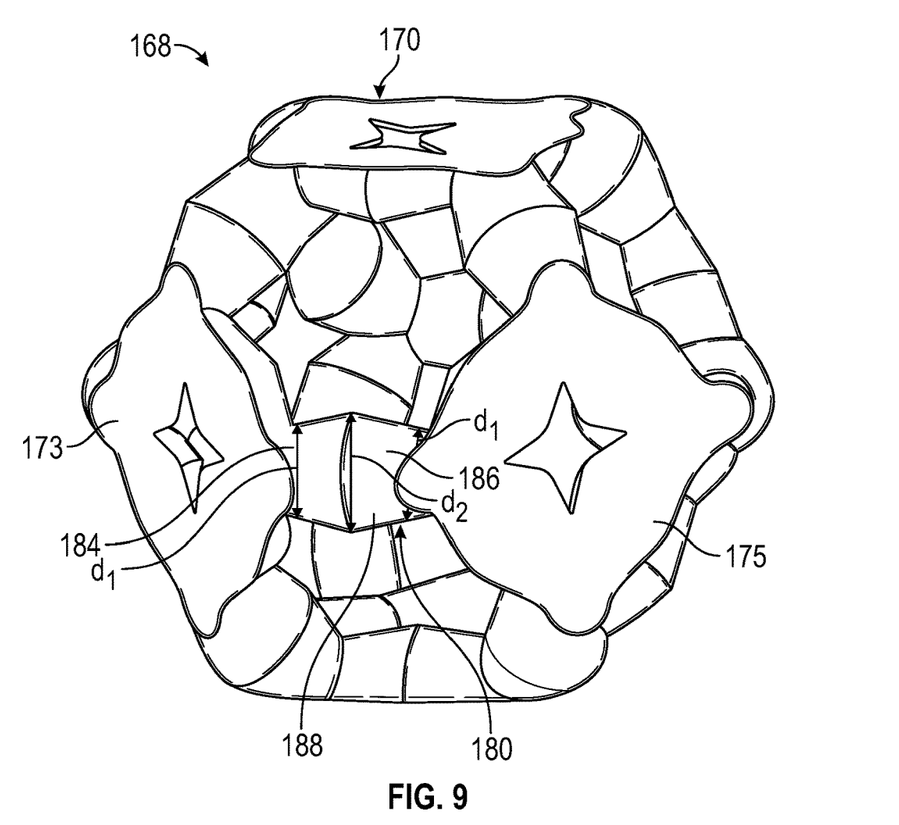
FIG. 9 is a plan view of the lattice structure of one of the plurality of interconnected cells of FIG. 8.

Reference will now follow to FIG. 9, with continued reference to FIG. 8 in describing a cell 168 of the plurality of interconnected cells 166. Cell 168 includes a plurality of nodes, two of which are indicated at 173 and 175. Nodes 173 and 175 are joined by a lattice element 180. At this point, it should be understood that each cell 168 includes at least six nodes that are connected through lattice elements similar to those discussed herein in connection with lattice element 180. In a non-limiting example, lattice element 180 includes a first end 184, a second end 186, and an intermediate portion 188.

In a non-limiting example, lattice element 180 includes a non-uniform diameter. In a non-limiting example, first end 184 of lattice element 180 has a first diameter "d1", second end 186 includes a second diameter "d1", and intermediate portion 188 includes a third diameter "d2" that is distinct from the first diameter and the second diameter. In a non-limiting example, the first diameter and the second diameter is about 2 mm and the third diameter is about 2.5 mm. In another non-limiting example, the first diameter and second diameter is about 1 mm and the third diameter is about 1.5 mm. It should be understood that the particular diameter of lattice element 180 may vary and can be tuned to specific space requirements between headliner 30 and steel frame member 32. Further, it should be understood that while discussed in connection with lattice element 180, each of the lattice elements of energy absorbing material 162 include similar structure.

Figure 10:
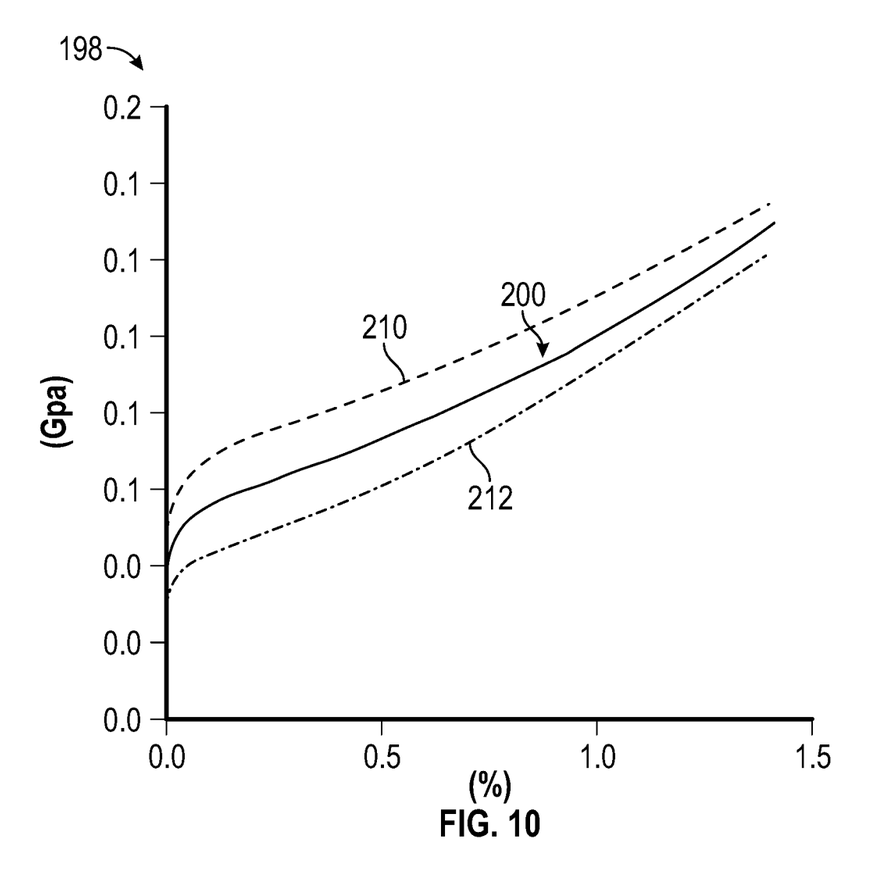
FIG. 10 depicts a graph illustrating material properties of a material used to form the energy absorbing material, in accordance with a non-limiting example.

In a non-limiting example, the energy absorbing materials described herein are formed from a printable nylon. That is, the energy absorbing materials described herein are additively manufactured from a nylon material having a response to static loading shown as stress measured in Gigapascals (GPa) versus a percentage of strain FIG. 10. That is, FIG. 10 depicts a graph 198 illustrating material response properties 200 of the printable material used to form energy absorbing materials described herein. The material response properties should remain with an upper boundary 210 and a lower boundary 212 to ensure that the energy absorbing materials conform to head injury criteria (HIC) set by government standards and guidelines.

At this point, it should be appreciated that the non-limiting example described herein represent energy absorbing material(s) that may be incorporated between a headliner and a steel frame of a vehicle to reduce head injuries. Moreover, the energy absorbing material(s) described herein meet and/or exceed Federal HIC criteria standards while at the same time providing designers with more flexibility in passenger compartment design. That is, the thickness of the energy absorbing material(s) described herein provide designers with options for increasing passenger compartment head room over existing materials.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle headliner formed from a head impact energy absorbing material comprising:
 a multi-cellular structure formed from a plurality of cells having a lattice structure defining the vehicle headliner, each of the plurality of cells including at least four nodes and at least one lattice element extending between each of the at least four nodes, the at least one lattice element having a diameter no greater than 2.5 mm, wherein the plurality of cells being interconnected one with another to form the multi-cellular structure.

2. The energy absorbing material according to claim 1, wherein the at least one lattice element extends substantially linearly between the at least two nodes of the at least four nodes.

3. The energy absorbing material according to claim 1, wherein the at least one lattice element is curvilinear and includes a bend portion.

4. The energy absorbing material according to claim 3, wherein the bend portion has an angle of about 132°.

5. The energy absorbing material according to claim 1, wherein each of the plurality of interconnected cells includes a body centered cubic geometry.

6. The energy absorbing material according to claim 1, wherein the at least one lattice element has a diameter of no greater than 1.0 mm.

7. The energy absorbing material according to claim 1, wherein the at least one lattice element includes a first end connected to one of the at least four nodes, a second end connected to another of the at least four nodes, and an intermediate portion.

8. The energy absorbing material according to claim 7, wherein the first end and the second end include a first diameter and the intermediate portion includes a second diameter that is larger than the first diameter.

9. The energy absorbing material according to claim 6, wherein the each of the plurality of interconnected cells includes a Kelvin lattice geometry.

10. The energy absorbing material according to claim 1, wherein each of the plurality of interconnected cells is formed from 3D printable nylon.

11. A vehicle comprising:
a body including a passenger compartment having a roof including an inner surface; and
a headliner mounted to the inner surface of the roof, the headliner including a head impact energy absorbing material disposed in the passenger compartment, the head impact energy absorbing material comprising:
a multi-cellular structure formed from a plurality of cells having a lattice structure, each of the plurality of cells including at least four nodes and at least one lattice element extending between each of the at least four nodes, the at least one lattice element having a diameter no greater than 2.5 mm, wherein the plurality of cells being interconnected one with another to form the multi-cellular structure.

12. The vehicle according to claim 11, wherein the at least one lattice element extends substantially linearly between the at least two nodes of the at least four nodes.

13. The vehicle according to claim 11, wherein the at least one lattice element is curvilinear and includes a bend portion.

14. The vehicle according to claim 13, wherein the bend portion has an angle of about 132°.

15. The vehicle according to claim 11, wherein each of the plurality of interconnected cells includes a body centered cubic geometry.

16. The vehicle according to claim 11, wherein the at least one lattice element has a diameter of no greater than 1.0 mm.

17. The vehicle according to claim 11, wherein the at least one lattice element includes a first end connected to one of the at least four nodes, a second end connected to another of the at least four nodes, and an intermediate portion.

18. The vehicle according to claim 17, wherein the first end and the second end include a first diameter and the intermediate portion includes a second diameter that is larger than the first diameter.

19. The vehicle according to claim 16, wherein the each of the plurality of interconnected cells includes a Kelvin lattice geometry.

20. The vehicle according to claim 11, wherein each of the plurality of interconnected cells is formed from 3D printable nylon.

\* \* \* \* \*